W. H. DRAKE.

STEAM BOILER.

No. 11,599. Reissued May 4, 1897.

Witnesses:

J. E. M. Bowen

M. C. Pinckney

Inventor:-

William H. Drake

THE NORRIS PETERS CO., PHOTO-LITHO., WASHINGTON, D. C.

UNITED STATES PATENT OFFICE.

WILLIAM H. DRAKE, OF HACKETTSTOWN, NEW JERSEY.

STEAM-BOILER.

SPECIFICATION forming part of Reissued Letters Patent No. 11,599, dated May 4, 1897.

Original No. 464,065, dated December 1, 1891. Application for reissue filed May 28, 1892. Serial No. 434,811.

*To all whom it may concern:*

Be it known that I, WILLIAM H. DRAKE, a citizen of the United States of America, residing at Hackettstown, in the county of Warren and State of New Jersey, have invented a certain new and useful Steam-Boiler, of which the following is a specification.

My invention relates to improvements in steam-boilers that are especially intended for steam and hot-water heating, though also adapted for furnishing steam for power on a small scale; and the invention has for its object to provide a boiler of the upright tubular style that shall be cast in sections, it being cast instead of constructed of wrought-iron, thus securing greater durability and cheapness, while obtaining as good steaming qualities as may be obtained by wrought-iron. My boiler comprises two sections, and the tubes are cast integral with the heads and shell of the boiler, thus dispensing with a multiplicity of joints which are necessary in wrought tubular boilers. The sections of my boiler are provided with simple and efficient connections that facilitate setting up the boiler for use and in detaching the parts for cleaning or removal.

My invention accordingly consists in a steam-boiler cast in two sections which are constructed in a novel manner and connected together as hereinafter fully described, and illustrated in the accompanying drawings.

Figure 1:
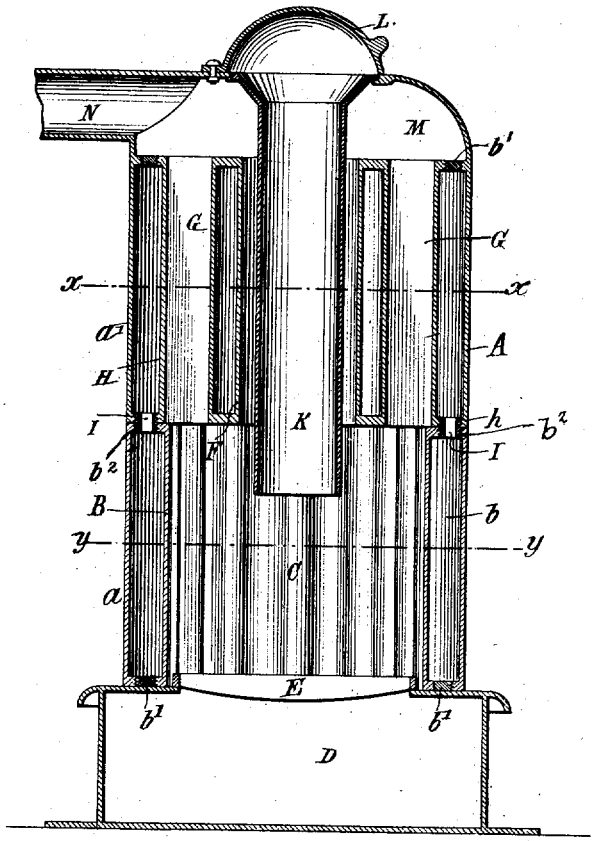
Figure 2:
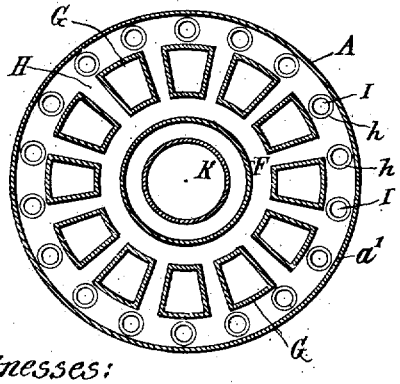
Figure 3:
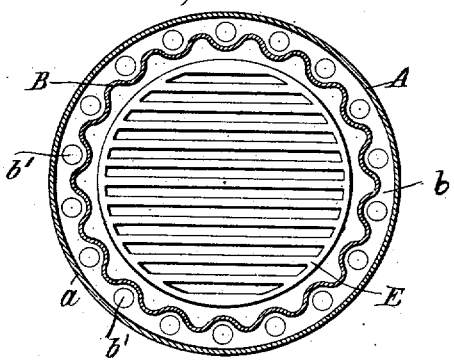

In the accompanying drawings, Figure 1 is a vertical section of a steam-boiler constructed in accordance with my invention. Fig. 2 is a cross-section on the line $x\ x$ of Fig. 1, and Fig. 3 is a cross-section on the line $y\ y$ of Fig. 1.

Referring to the drawings, A designates an upright tubular boiler cast in two sections $a$ $a'$. The lower section $a$ is cast to form one-half of the height of the entire boiler when the boiler is put together and is provided with the interior currugated wall B, which forms the walls of the fire-box C, and between which wall and the outer wall of said lower section the water-space $b$ is provided. The said lower section $a$ is seated upon the ash-box D, over which and at the bottom of the inclosed fire-box C is the ordinary grate E, upon which the fire is kindled. Surrounding the base of said lower section $a$ is a series of screw-threaded openings, into which are firmly seated the screw-plugs $b'$, which close said openings, the latter communicating with the water-space $b$ between the outer shell of said lower casting $a$ and the inner wall B, thus providing means of access to said water-space to remove sediment, &c., which may collect therein. In the top plate of the lower section $a$, directly above the openings closed by the screw-plugs $b'$, are threaded openings $b^2$, which also communicate with the water-space below and provide communication and connection between the two sections $a$ $a'$ of the boiler, as presently explained. The entire upper section $a'$, comprising the remaining part of the boiler, is also cast in one single piece—that is, all the parts thereof are cast integral. Within this upper section $a'$ is a large central circular fire-flue F and a series of concentric independent fire-flues G, all of which are, as stated, cast integrally with said section $a'$ of the boiler. Between these flues or tubes and surrounded by the outer wall or shell of the section $a'$ is the inclosed water or steam space H, having a suitable inlet for water and outlet for the steam. In the bottom plate of this upper casting (section $a'$) is a series of openings $h$, which are arranged at intervals corresponding to the perforations $b^2$ in the top plate of the lower casting (section $a$) and adapted to register therewith when the two sections $a$ $a'$ are placed together, as shown in Fig. 1. When they are so placed, a screw-thread is cut in these openings and across the joint between the two sections $a$ $a'$, which are firmly held together and the joints between them tightly closed by means of short tubular nipples I, threaded their entire length and screwed into said threaded openings $b^2$ $h$ from within the boiler, thus forming a compact and rigid joint between the said two sections and providing means whereby the water is allowed a free circulation between the same. It is obvious that a joint formed as above described is cheap and that, unlike a joint made with packing, it will not deteriorate with age and become leaky.

Around the top edge of the upper casting (section $a'$) is a series of plugged openings $b'$, corresponding with the plugged openings $h$ in the bottom plate of the same casting and which furnish means for access to the water-space of said section $a'$ and also for inserting the nipples I.

Depending within the large circular flue F from the top of the boiler-shell is the coal magazine or feeder K, which provides ordinary means for supplying coal to the fire, the upper end of said feeder being closed by the usual cover L and its lower end extending a slight distance below the lower edge of the fire-flues into the fire-box.

The smoke and gases from the fire-chamber C pass up through the tubes into the smoke-chamber M and from thence into the usual smoke-pipe N, while the entrance of water and the exit of steam are provided for in the usual manner.

I am aware that previous to my invention the sections of boilers have been united together by bolts and lugs and that at the points where the several water-ports of the sections came together the joints were made with rubber, putty, &c., and also that two sections of a steam-boiler and of a radiator have been united by inserting a single threaded nipple in an aperture between the sections and turning the sections one upon the other to screw them together; but the nipples thus employed, while tubular, were not threaded continuously from one end to the other, but were provided with two distinct threads cut from their ends to the centers. Otherwise it would not be necessary to turn the sections one upon the other while uniting them. Obviously only one such nipple could be made use of when connecting any two sections, since to make the connection one section must be turned upon the other. In my invention I do not make use of the "close nipple" above described, which is provided with two distinct threads meeting at the center of its length. The nipples that I employ have a single continuous thread and must be so formed to unite my boiler-sections in the manner explained; but I make no claim *per se* to a continuously-threaded nipple, the same being an element only of my combination.

Having thus described my invention, what I claim as new, and desire to secure by Letters Patent, is—

1. In an upright tubular boiler, an upper part or section comprising a shell, section-heads, a large centrally-arranged fire-flue and a series of concentrically-arranged vertical fire-flues between said central flue and the shell and not in contact with either, and a water-space between the shell and central fire-flue and extending entirely around the concentric flues, substantially as set forth.

2. In an upright tubular boiler, an upper part or section comprising a shell, section-heads, a large centrally-arranged fire-flue and a series of concentrically-arranged vertical fire-flues between said central flue and the shell, but not in contact with either, and a water-space between the shell and central fire-flue and completely around the concentric flues, combined with a lower section including a water-space, the two sections connected together by screw-threaded nipples inserted across the joint between the two sections and the sections being in approximate contact where the nipples are inserted, such nipples having a single continuous thread, and adapted to be fitted and screwed into place from within the boiler and wholly from one direction, whereby the boiler-sections are firmly united together as in an integral structure, substantially as set forth.

3. An upright tubular boiler, the same consisting of an upper and lower casting, the lower casting being provided with an integral inner corrugated wall inclosing a water-space and the fire-box and the top edge of said casting being further provided with threaded perforations communicating with the water-space, the upper casting provided with a large central flue and a series of concentric smaller flues integrally cast with the shell of the boiler and the said casting being provided around its lower edge with a series of threaded perforations communicating with the inclosed water-space, and exteriorly-threaded nipples joining the threaded perforations in both castings, which are in absolute contact, substantially as set forth.

Signed at Hackettstown, Warren county, New Jersey, this 13th day of May, 1892.

WILLIAM H. DRAKE.

Witnesses:
WILLIAM D. WILLIAMS,
WATSON MCLAIN.